United States Patent [19]

Reeves

[11] Patent Number: 4,792,427
[45] Date of Patent: Dec. 20, 1988

[54] METHOD FOR MAKING LIGHT-TRANSMITTING SLATS FOR BLIND

[75] Inventor: John F. Reeves, Brown Deer, Wis.

[73] Assignee: Nanik Division Wausau Metals Corporation, Wausau, Wis.

[21] Appl. No.: 36,302

[22] Filed: Apr. 9, 1987

Related U.S. Application Data

[60] Division of Ser. No. 879,270, Jun. 27, 1986, abandoned, which is a continuation of Ser. No. 494,427, May 13, 1983, abandoned.

[51] Int. Cl.$^4$ .................. B29C 43/22; B29C 53/04; B32B 3/26; B32B 31/12
[52] U.S. Cl. .................. 264/285; 264/134; 264/280; 264/295; 264/320; 264/339
[58] Field of Search .............. 264/134, 145, 156, 157, 264/160, 280, 282, 285, 295, 320, 339

[56] References Cited

U.S. PATENT DOCUMENTS

| | | | |
|---|---|---|---|
| 2,155,985 | 4/1939 | Waterman | 156/17 |
| 2,267,869 | 12/1941 | Loehr | 156/17 |
| 2,315,605 | 4/1943 | Enrenfeld | 160/114 |
| 2,318,525 | 5/1943 | Renton | 160/173 |
| 2,534,673 | 12/1950 | Holland | 160/236 |
| 2,620,869 | 12/1952 | Friedman | 160/236 |
| 2,633,191 | 3/1953 | Curtis, Jr. | 160/176 |
| 2,709,488 | 5/1955 | Lorentzen | 160/176 |
| 2,734,245 | 2/1956 | Chamberlain | 264/280 |
| 3,217,631 | 11/1965 | Thompson et al. | 98/121 |
| 3,281,516 | 10/1966 | Southwick | 264/285 |
| 3,454,693 | 7/1969 | Crenshaw | 264/285 |
| 3,645,317 | 2/1972 | Malone | 160/168 |
| 3,757,718 | 9/1973 | Johnson | 264/323 X |
| 3,776,672 | 12/1973 | Heilmayr | 264/285 X |
| 4,091,592 | 5/1978 | Berlad et al. | 52/616 |
| 4,150,086 | 4/1979 | Stenhall | 264/285 |
| 4,242,414 | 12/1980 | McKenzie | 428/412 |
| 4,329,307 | 5/1982 | Westcott et al. | 264/160 |
| 4,336,834 | 6/1982 | Schaller | 160/168 A |
| 4,614,632 | 9/1986 | Kezuka et al. | 264/280 |
| 4,649,008 | 3/1987 | Johnstone et al. | 264/285 |

FOREIGN PATENT DOCUMENTS

| | | | |
|---|---|---|---|
| 396738 | 5/1941 | Canada . | |
| 512874 | 5/1953 | Canada . | |
| 1076313 | 4/1980 | Canada . | |
| 0062372 | 5/1977 | Japan | 264/280 |

Primary Examiner—Jan H. Silbaugh
Assistant Examiner—Karen D. Kutach
Attorney, Agent, or Firm—Lathrop & Clark

[57] ABSTRACT

A method for making light, thin, thermoplastic slats for use in decorative window blinds of the Venetian or vertical rotatable slat types. Strips are prepared of flexible and resilient planar thermoplastic material of not more than 1/16 inch thickness with selected light transmitting qualities. The strips are then deformed into a permanent V-shaped cross-sectional configuration which is stiff and will not sag when supported by spaced blind slat supporting means. The deformation step is accomplished by bending the strips without the application of heat over a forming surface of not more than ¼ inch radius to exceed the elastic limit of the strip material over the radius.

13 Claims, 2 Drawing Sheets

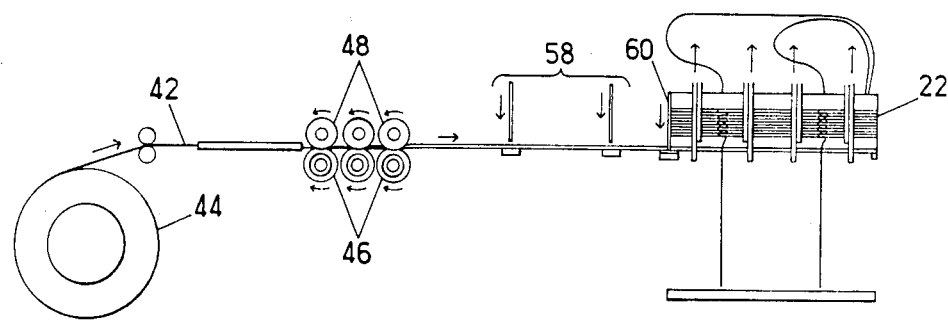
FIG. 5
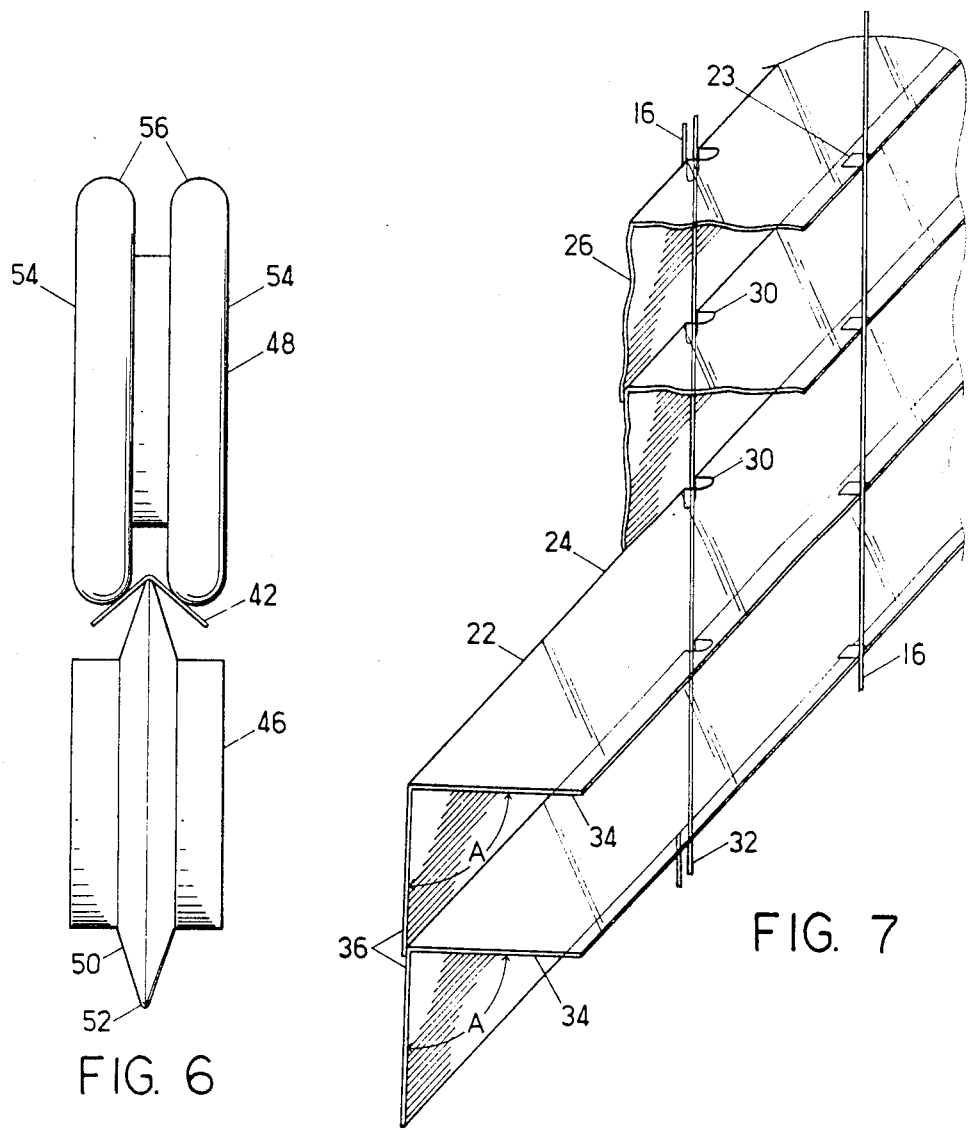
FIG. 6
FIG. 7

METHOD FOR MAKING LIGHT-TRANSMITTING SLATS FOR BLIND

This is a division of application Ser. No. 879,270, filed June 27, 1986, now abandoned, which is a continuation of application Ser. No. 494,427, filed May 13, 1983, now abandoned.

TECHNICAL FIELD

The present invention relates to blinds in general and, in particular, to blinds having rotatable, light-transmitting slats.

BACKGROUND OF ART

The art is generally cognizant of blinds having slats adapted to transmit at least some of the light that impinges on them. Malone, U.S. Pat. No. 3,645,317 shows a conventional Venetian blind in which the slats are covered with a thin layer of metal to reflect unwanted infra red radiation and yet remain generally transparent to visible light. In the closed position, the slats of Malone overlap, doubling the light-blocking effect of the blind.

The art is also cognizant of blinds that have a selected color on one face and a second color on the other face. An example is Schaller, U.S. Pat. No. 4,336,834.

The use of blind slats bent along their longitudinal axis so as to acquire a cross sectional configuration similar to an inverted V is also known. Examples include Berlad, et al., U.S. Pat. Nos. 4,091,592, Renton, 2,318,525, and Ehrenfeld, 2,315,605. Thompson, et al., 3,217,631, shows a similar configuration employed as a fixed louver. In each case, the bent slat is opaque and is adapted not to be turned about its longitudinal axis. The purpose of the bent configuration of the slats is to block light or provide privacy while allowing a substantial flow of air.

BRIEF SUMMARY OF THE INVENTION

The present invention is summarized in that a blind having an interior side and an exterior side includes a plurality of elongated slats made of a flexible and generally resilient material having selected light-transmitting qualities. Each slat has an upper surface and an under surface and a generally V-shaped transverse cross sectional configuration in which a first portion and a second portion of the slat correspond to the two sides of the V, the first and second portions intersecting at the apex of the V at a selected angle A of 90° to 160°. Means are provided for suspending the slats in parallel relation, the suspension means being adapted to rotate the slats about their longitudinal axes between an inwardly facing position, in which the upper surfaces of the slats are presented at the interior side of the blind with the first portions of the slats lying substantially within a single plane, and an outwardly facing position, in which the upper surfaces are presented at the exterior side of the blind and the second portions of the slats lie generally within a single plane. The suspension means is further adapted to hold the slats at a distance from each other such that when the slats are in one of the inwardly facing and outwardly facing positions the portions of the slats not then co-planar extend sufficiently far toward the slat immediately adjacent thereto as to overlap the immediately adjacent slat, to prevent the passage of light in a direction generally normal to the co-planar portions of the slats without that light being interrupted by the slats.

A primary object of the invention is to provide for a blind structure that is adapted to substantially cover an opening to reduce the glare and light entering through the opening but to achieve this end without blocking all of the light that passes therethrough.

A second object of the invention is to provide a blind having slats formed such that the predominant visual effect of the slats of the blind is that they present a substantially planar surface to the viewer while still allowing for air passage therethrough.

A further object of the invention is to provide a blind capable of being selectively turned to a first position, in which the blind has a first light-transmitting quality, and a second position, in which the blind has a second and different light-transmitting quality.

Yet another object of the invention is to provide a blind the slats of which are divided into longitudinally extending portions of differing light transmitting abilities or colors, the slats being adapted to exhibit predominantly one or the other light-transmitting quality or color to an observer of the blind.

A further object of the invention is to provide such a blind and slats therefor that exhibit self-extinguishing burning characteristics.

Yet another object of the invention is to provide a method for making blinds having the qualities referred to above in which the blind slats are strong but nevertheless light and thin enough to be conveniently drawn up to the top of the blind with a minimum of effort into a slender stack of slats.

Other objects, features, and advantages of the invention will be apparent from the following detailed description taken in conjunction with the accompanying drawings showing a preferred embodiment of a blind exemplifying the principles of the invention.

BRIEF DESCRIPTION OF THE DRAWINGS

FIG. 5 is a schematic representation of a manufacturing arrangement for the blind of the invention.

FIG. 6 is a schematic side elevation view of a pair of forming rollers.

FIG. 7 is a perspective view corresponding to that of FIG. 4 showing an alternative embodiment of the slats of the invention, with several slats broken away.

DETAILED DESCRIPTION OF THE PREFERRED EMBODIMENT

Figure 1:
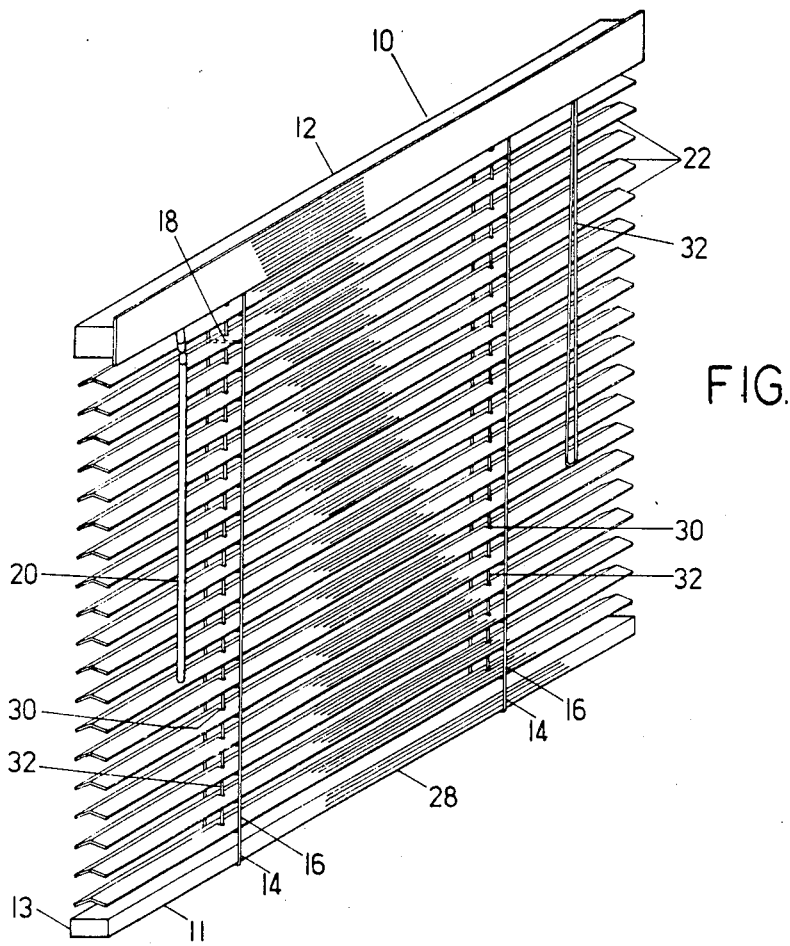
FIG. 1 is an isometric perspective view of a blind for a window made in accord with the principles of the invention.

Referring more particularly to the drawings, wherein like numbers refer to like parts, FIG. 1 shows a blind, generally indicated at 10, made in accord with the present invention. The blind 10 shown is especially adapted to be used to cover a window, but the blind of the invention may be used to cover other openings or to provide a screen independent of an opening. For convenience of reference, the blind 10 is determined to have an interior side 11 and exterior side 13. A head rail 12 extends across the top of the blind 10 and is adapted to be mounted horizontally. The head rail 12 includes a tilt rod (not shown) extending lengthwise therein and adapted to turn about its longitudinal axis. Ladders 14 made of string or other flexible materials extend downwardly from the head rail 12. Each ladder has parallel side strands 16 connected by spaced rungs 18, shown in phantom in FIG. 1. The side strands are wound on the tilt rod, so that, as the tilt rod is rotated about its longitudinal axis one way or the other, each side strand 16 of each ladder 14 is alternately raised or lowered. Preferably a wand 20 is provided that is attached to the tilt rod by a conventional mechancial linkage (not shown) such that when the wand is turned about its longitudinal axis, the tilt rod turns in a corresponding fashion.

The blind 10 has elongated slats 22 that, in the embodiment shown in FIG. 1, extend the width of the blind and are supported by rungs 18 of at least two ladders 14 or by comparable means for support. In the embodiment of the invention shown in FIG. 7, the rungs 18 are omitted, and adhesive tabs 23 are employed as an alternative means for support. The tabs 23 are flexibly attached to the side strands 16, effectively moving in hinged relation thereto. The tabs 23 are securely adhered to the slats 22, to support them on the side strands 16. Other conventional support means are familiar to one skilled in the art and fall within the scope and spirit of the invention.

As the side strands 16 of the ladders 14 are moved as a consequence of the rotation of the tilt rod, each slat 22 may be rotated about its longitudinal axis in concert with the other slats. Each slat has an upper surface 24 and an under surface 26. The slats 22 may be held in a neutral position, shown in FIG. 2, in which the upper surface 24 is presented toward the head rail 12. From this neutral position, the slats may be rotated to an inwardly facing position, shown in FIG. 3, in which the upper surface 24 is presented at the interior side 11 of the blind 10, and to an outwardly facing position, shown in FIG. 4, in which the upper surface 24 is presented at the exterior side 13 of the blind.

The ladders 14, with their side strands 16 and rungs 18 (or equivalent support means such as the adhesive tabs 23) constitute means for suspension of the slats 22 adapted to selectively rotate the slats about their longitudinal axes. Clearly alternative suspension means are possible. Slats 22 could be supported from their ends and rotated by any of many means known in the art. The suspension means shown is adapted to support the slats 22 in a generally horizontal orientation. However, conventional suspension means are known whereby the slats 22 could be held so as to extend generally vertically. All such alternative embodiments are within the scope and spirit of the invention.

In the embodiment shown in FIG. 1, a sill rail 28 is located beneath the slat 22 most remote from the head rail 22. The side strands 16 of the ladders 14 are fastened to the sill rail, which rotates along its longitudinal axis as the slats 22 are rotated. Each slat 22 has cord slots 30 extending between the upper and under surface 24, 26 thereof. Each slat 22 has at least two cord slots 30, each slot preferably located at a point at which the slat is supported by the support means of a ladder 14. Lift cords 32 extend from the sill rail 28 upwardly through each set of corresponding cord slots 30 of the slats 22. The lift cords 32 extend to the head rail 12 and are routed over pulleys or comparable mechanisms (not shown) to a convenient side location. Preferably a cord lock (not shown) is fastened to the head rail 12, and the lift cords 32 are routed therethrough. The cord lock is adapted to selectively lock and release the lift cords 32, so that a user of the blind may pull the lift cords 32, moving the sill rail 28 and the slats 22 to a raised position, and then lock the lift cords 32 by means of the cord lock to cause that raised position to be maintained.

Figure 2:
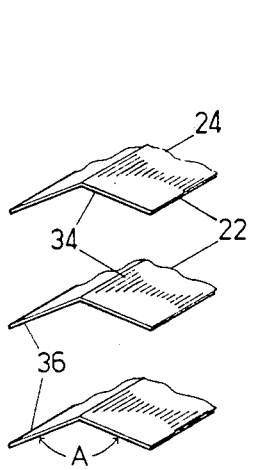
FIG. 2 is a perspective view of broken away portions of several of the adjacent slats of the blind of FIG. 1.
Figure 3:
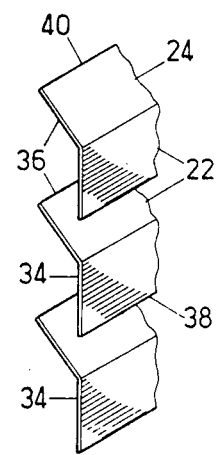
FIG. 3 is a perspective view of the slats of FIG. 2 in a closed position.
Figure 4:
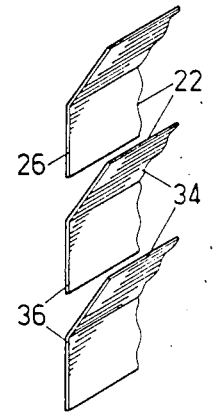
FIG. 4 is a perspective view of the slats of FIG. 2 in an alternative closed position.

The preferred embodiment of the slat 22 of the invention has a V-shaped transverse cross sectional configuration, as is apparent in FIGS. 2, 3, and 4. Preferably the V-shape opens generally downwardly, but a generally upwardly opening orientation is also possible, as are sideways opening orientations in the event that the slats are held vertically by an alternative suspension means, as is discussed above. All such alternative embodiments are within the scope and spirit of the invention. Each slat has a first portion 34 and second portion 36 corresponding to the two sides of the V. The first and second portions 34, 36 intersect (at the apex of the V) at an angle A. The angle A is selected to be generally between 90° and 160°, with all of the slats 22 within a single blind 10 exhibiting the same angle A. The first and second portions 34, 36 form the interior and exterior portion respectively of the slat 22 when it is in the neutral position. The first and second portions 34, 36 terminate in first and second edges 38, 40 that extend parallel to the longitudinal axis of the slat 22.

When the slats 22 of the blind 10 are in the inwardly facing position, the first portion 34 of each of the slats 22 lies substantially within a single vertical plane, as can be appreciated by reference to FIG. 3. Similarly, when the slats 22 are in the outwardly facing position, the second portion 36 lies generally within a single vertical plane, as is illustrated in FIG. 4. Preferably the distance between the support means of the ladders 14 is selected to be such that when the slats 22 are in the inwardly facing position, the second portion 36 of each slat extends sufficiently far toward the slat 22 immediately adjacent thereto to overlap the first portion 34 of the adjacent slat 22. Similarly, when the slats 22 are in the outwardly facing position, the first portion 34 of each slat extends sufficiently far toward the slat 22 immediately adjacent thereto to overlap the second portion 36 of the adjacent slat. Thus, when the slats 22 are in either the inwardly or outwardly facing position, light cannot pass through the blind 10 in a direction generally normal to the common plane in which either the first or second portions 34, 36 of the slats 22 lie without impinging on the slats.

The basic V-cross sectional slat shape disclosed has various advantages, including those disclosed herein. However, it will be apparent to one skilled in the art that two such V shapes may be combined to create related shapes. For example, two V-shaped slats joined at an edge 38, 40 of each (or, expressed alternatively, having a portion 34, 36 in common) with both V's opening generally in the same direction form a flat-bottomed channel. Two V's similarly joined but opening in generally opposite directions form a Z-shaped cross sectional shape. Similarly, the first and second portions of both single and combined V's may differ in length, all within the scope and spirit of the invention.

The slats 22 are made of a material having selected light transmitting qualities. Preferably at least one of the first and second portions 34, 36 is transparent so that a user of the blind 10 may see out through the transparent portions with minimal obstruction. If the first portions 34 are transparent and the slats 22 are in the inwardly facing position with the first portions substantially within a single plane, a minimum of distortion of the view seen through the blind 10 will occur. In the event the second portion 36 is transparent, the same analysis holds when the slats 22 are in the outwardly facing position. The transparent material from which the slats 22 may be made may be colored to screen out glare or provide an aesthetically pleasing tint when viewed from either the interior or exterior sides 11, 13. The transparent material may be blackened to a desired shade. Likewise, a transparent material may be selected that is opaque to ultra violet light or any selected range of light wavelengths. Alternatively, the slats 22 may be made of a material that both transmits and diffuses visible light, a quality that hereinafter will be referred to as "translucency."

In one preferred embodiment of the invention, the first and second portions 34, 36 of the slats 22 are made of the same material and have the same light-transmitting qualities. However, in an alternative embodiment, the light-transmitting abilities of the first and second portions differ. Thus, one portion may be transparent and have a selected color. The remaining portion may be transparent and of a different color, translucency, opaqueness, reflectiveness, or the like. It will be appreciated that in either the inwardly facing or outwardly facing positions, whichever portions 34, 36 of the slats 22 are substantially co-planar will be responsible for the predominating effect on light passing through the blind 10 in a direction generally normal to the plane. Thus, slats 22 in which the first and second portions 34, 36 have different colors may be changed from the inwardly facing to the outwardly facing position with the effect of changing the perceived color of the blind 10. One of the first and second portions 34, 36 may be made darker than the other, allowing the selection of the degree to which the glare of a bright day can be eliminated. If the angle A is made approximately equal to 90°, as is shown in FIG. 7, and if one of the first and second portions 34, 36 is made of a material that is translucent, opaque, or reflective, that portion can be moved to the co-planar position and completely obstruct the view through the blind, providing privacy, darkness, the reflection of radiant energy, or comparable effects, depending on the nature of the material used. The other portion may be transparent, for example, providing in a single blind 10 the option of subjecting substantially all of the light entering through the blind to two entirely different light modifying treatments.

The slats 22 of the invention may be made of any suitable, sufficiently rigid material. It is preferred that the slats be made of plastic, polycarbonate plastics being preferred. The term "polycarbonate" as used herein includes alloys of polycarboante. Polycarbonate plastics alloyed with ABS plastics are known in the art and likewise are well suited to many embodiments of the invention disclosed herein. A wide variety of light-transmitting qualities may be imparted to such plastics, by mixing coloring material in with the plastic when it is formulated, coating plastic stock material on either one or all sides, laminating, and the like. Such plastics may be immersed in or sprayed with materials that chemically bond with the plastic, may be painted or otherwise treated with materials that simply adhere to the surface of the underlying plastic, or may be subjected to a mechanical surface treatment selected to render a transparent plastic translucent as, for example, by roughening the surface. Selected parts of a slat 22 may be subject to such treatments independent of the rest of the slat.

Polycarbonate plastics are preferred also because they have important fire-resisting qualities. Such plastics are available that, in thicknesses of 0.062 inches, achieve an SE-1 ("self-extinguishing—1") rating under the Underwriters Lab Flammability Test, Bulletin 94, and an SE ("self-extinguishing") rating under the ASTM D635-68 flammability test. Bromine-modified forms of the plastic are available that, when subjected to the same tests and in the same thicknesses, attain an SE-0 Underwriters Lab rating and an NB ("non-burning") ASTM D635-68 rating. The polycarbonate plastics sold by the General Electric Company under the trademark "LEXAN" are examples of such plastics. Favorable flammability characteristics are very important when many slats 22 are used even in a single blind 10. Control of fire hazards is even more important when many blinds 10 are located within a given area or building.

In the method for making slats 22 of the invention, a strip 42 of planar, plastic stock material of a selected width is prepared. Commonly plastic is manufactured in rolls of considerable width, in which case strips 42 may be prepared having a width substantially that of the slat 22 to be manufactured by sawing, shearing, or the like. Preferably, the strip 42 of planar, plastic stock material so prepared is of indefinite length and is of sufficient flexibility that the strip may be stored as a reel 44 for convenient handling.

The strip 42 is then cold-formed to impart to it the V shape disclosed above. "Cold-forming" is the process of changing the shape of a stock material by mechanical manipulation without the application of heat sufficient to render the stock material plastic. Preferably, the strip 42 is directed lengthwise between male and female forming rolls 46, 48. The forming rolls 46, 48 are generally circular and are adapted to rotate about their central axes.

The male forming roll 46 has an annular male forming member 50 that terminates in a V-shaped male forming surface 52. The apex of the male forming surface 52 has a radius selected to impart a generally V-shaped transverse cross sectional configuration to the strip 42 in which first and second portions of the strip (destined to become the first and second portions 34, 36 of the slat 22 being formed) correspond to the two sides of the V, intersecting at the apex of the V at the selected angle A of 90° to 160° desired in the finished slat 22.

The female forming roll 48 has two, annular female forming members 54 separated by a selected distance. Preferably the female forming members 54 terminate in a generally rounded female forming surfaces 56, although the female forming surface may also be flat, or even present an edge toward the male forming roll 46, all within the scope and spirit of the invention. The axes of the male and female forming rolls 46, 48 are oriented parallel to each other with the male forming surface 52 extending between the female forming surfaces 56. As a strip 42 is directed between the male and female forming rolls, 46, 48, the male forming surface 52 deflects the strip into a V shape of the sort exhibited by the slats 22, as disclosed above. The male forming roll 46 is so located relative to the female forming roll 48 that, as the male forming surface 52 is inserted further and further between the female forming surfaces 56, the angle A imparted to the strip 42, corresponding to the angle A as defined relative to slats 22, is made smaller and smaller.

Alternative means for cold-forming the strip 42 are possible. For example, either one or both of the generally circular forming rolls 46, 48 disclosed above may be replaced by endless belts. Such belts may be held tautly by pulleys or be otherwise supported in an orientation relative to each other analogous to that disclosed for the circular forming rolls 46, 48. One belt may present outwardly a male forming surface analogous to that discussed above. The male forming surface may be inserted between two parallel belts, each presenting one female forming surface toward the male forming surface. It will be apparent that circular forming rolls and such endless belts may be used together, as well. For example, one or more male forming rolls 46, having the structure disclosed above, may be used with a pair of endless belts each presenting a female forming surface toward the male forming roll, one on either side thereof. The use of such systems, as well as the use of breaks and other cold-forming machinery known in the art, is well within the scope and spirit of the invention.

Many plastics exhibit a pronounced resilience, requiring that they be considerably deformed before the elastic limit of the plastic is exceeded and a permanently remaining shape may be successfully imparted to the plastic in a cold-forming process. As a consequence, gradual curves are difficult to impart to certain plastics by a cold-forming process. The plastic can be deformed into those curves while held between the forming members, but, if the curve is within the elastic limit of the plastic, when the forming members are withdrawn, the plastic returns to its original shape. Thus, the radius of the apex of the male forming surface 52 must be chosen to be such that the deformation of the plastic strip 42 over that radius is sufficient to exceed the elastic limit of the strip.

When a flat piece of material having a given thickness is bent, the part to the outside of the bend experiences the greatest strain. Thus, the elastic limit in the piece of material is exceeded first in that part, to result in a permanent change of shape. As the material is selected to be increasingly thick, the elastic limit is exceeded with bends of increasingly large radii. When polycarbonate plastics are used to make slats 22, it has been found desirable to restrict the thickness of the slats to 1/16 inch or less. This is done to minimize weight, bulkiness, and expense. 1/16 inch polycarbonate plastic can be cold-formed with a male forming surface 52 having an apex with a radius of ¼ inch or less. The preferred slat thickness when the slats 22 are made of polycarbonate plastic is from 0.015 to 0.030 inches, in which case it has been found desirable to reduce the radius nearly to 0 and in any event to not more than ⅛ inch. Polycarbonate slats 22 of this thickness are lightweight and easily manipulated. Because of the V-shaped cross sectional configuration disclosed above, the slats 22 are desirably stiff and do not sag between the sppporting means or at the ends of the slats, even when the thickness is less than 0.015 inches. Nevertheless, the polycarbonate material is sufficiently flexible and resilient to withstand a great deal of the bending and flexing incidental to the normal use of a blind.

Many plastics exhibit "memory," the tendency to return to or toward an undeformed state after deformation. Consequently, it is sometimes necessary to impart an initial deformation to the strip 42 that exceeds that eventually desired. Then, after the strip 42 has exhibited such memory as it has been determined by experiment to have, the final deformation will be the desired one.

The degree of deformation can be controlled by so locating the male and female forming rolls 46, 48 relative to each other that the male forming surface 52 extends increasingly between the female forming members 54. Depending on the plastic used to make the strip 42, it may be desirable to direct the strip between a series of male and female forming rolls 46, 48, as is illustrated schematically in FIG. 5, each pair of rolls increasingly deforming the strip to achieve a final degree of deformation.

The preferred plastic from which to prepare the strip 42 is polycarbonate plastic material of the sort discussed above. Such plastics may be conveniently coated with an acrylic plastic material to impart desired light-transmitting qualities to the strip 42. The polycarbonate plastic is immersed in a solvent containing the acrylic plastic, which is deposited on the surface of the strip 42. Acrylic plastics are generally more brittle than polycarbonate plastics and cannot be conveniently cold-formed, especially when considerable deformation is required. Consequently, when an acrylic-coated polycarbonate plastic strip 42 is prepared, it is desirable to heat the strip to a temperature of at least 125° F. but not more than 200° F. before subjecting the strip to cold-forming. This is especially desirable when an acrylic coating is applied to both surfaces of the strip 42. The acrylic-coated strip 42 should not be elevated in temperature to the point that the rigidity of the polycarbonate plastic is substantially changed. However, by heating the strip within the temperature range indicated, the acrylic plastic coating is rendered thermoelastic and capable of moving with the polycarbonate plastic strip through the cold-forming process without separating therefrom or otherwise being rendered unsatisfactory. The result is a cold-formed plastic strip 42 having a surface coated with acrylic plastic exhibiting a hardness and optical qualities unobtainable in uncoated polycarbonate plastic.

Either before or after the strip 42 has been deformed by the male and female forming rolls 46, 48, it is directed to conventional punches adapted to cut portions of the strip to desired slat lengths and to create cord slots 30. Such punches are shown schematically in FIG. 5, where first punch 58 is adapted to create cord slots 30. The strip 42 is then advanced through a second punch 60 until the desired slat length extends beyond the second punch. The second punch 60 is adapted to cut off the slat 22, imparting a desirably curved contour both to the end of the slat 22 so separated from the strip 42 and to the now leading end of the strip 42 remaining. By this means, a single punch 60 in one step imparts the desired shape to the trailing end of first slat 22 and the leading end of the next slat 22. The slats 22 so formed may be fed into the ladders 14 and suspended upon rungs 18 or other support means, as disclosed above, by conventional automatic machinery.

It will be appreciated that the method of manufacture disclosed above has many advantages. The method provides for a continuous feed of stock material and a continuous production of slats 22. As opposed to a molding process, the cold-forming process is fast and efficiently requires no molding time or the procurement of sophisticated molds. The male and female forming rolls 46, 48 may be adjustable so that a single forming operation may be adapted to manufacture slats 22 exhibiting a variety of angles A. Furthermore, since the process is one of cold-forming, the movement of the strip 42 may be interrupted or periodic if that is desirable to aid the functioning of the punches or other aspects of the machinery. Upon being stopped in its movement through the cold-forming machinery, no portion of the strip 42 remains between heated rollers that might cause it to be unevenly deformed.

It is understood that the present invention is not limited to the particular construction and arrangement of parts illustrated and disclosed, nor to the particular materials disclosed, nor to the particular steps disclosed herein. Instead, it embraces all such modified forms thereof as come within the scope of the following claims.

What is claimed is:

1. A method for making a light, thin thermoplastic slat for use in a decorative window blind having a plurality of slats supported in parallel relation and adapted to be rotated about their longitudinal axes, the method comprising the steps of:
   (a) preparing a strip of flexible and resilient planar thermoplastic material of not more than about 1/16 inch thickness, having selected light-transmitting qualities;
   (b) deforming the planar strip into a permanent V-shaped transverse cross-sectional configuration, in which first and second portions of the strip correspond to two sides of a V intersecting at an angle of 90° to 160°, which is stiff and will not sag when supported by spaced blind slat supporting means, by continuously directing the strip lengthwise between the apex of a male forming member and a pair of female forming members spaced on either side of the male forming member in opposed relation and bending the strip without the application of heat over the apex of the male member having a radius forming of not more than ¼ inch to exceed the elastic limit of the strip material over the radius to provide a strip which will have first and second portions extending on either side of a bend at the desired angle of 90° to 160° after the strip material has exhibited characteristic return toward its undeformed state due to memory.

2. The method of claim 1 wherein at least one of the first and second portions of the strip is transparent and transmits light with a minimum of distortion.

3. The method of claim 1 wherein the deformation step comprises directing the strip lengthwise between rotatable male and female forming rolls, the male forming roll having an annular male forming member that terminates in a V-shaped forming surface having an apex, the female forming rolls having two annular female forming members spaced on either side of the male forming member in opposed relation, and wherein the strip is directed between the male forming member and the female forming members in a continuous manner so that the strip is progressively deformed by the apex of the male forming member as the strip is restrained on either side of the apex by the female forming surface.

4. The method of claim 1 wherein the thermoplastic material has a thickness of from 0.015 to 0.030 inches and wherein the forming surface has a radius of not more than ⅛ inch.

5. The method of claim 1 wherein the thermoplastic material is selected from the group consisting of polycarbonate, alloys of polycarbonate, and material exhibiting deforming characteristics substantially similar to polycarbonate.

6. The method of claim 1 wherein the deformation step comprises continuously directing the strip lengthwise between the apex of a V-shaped annular male forming member and a pair of annular female forming members spaced on either side of the male forming member in opposed relation so that the strip is deformed by the apex of the male forming member as it is restrained on either side of the apex by the female forming surfaces.

7. The method of claim 6 wherein the strip is deformed to a transverse V-shaped cross-sectional configuration in which first and second portions of the strip intersect at an angle which decreases as the male forming member is inserted further between the female forming members.

8. A method for making a light, thin thermoplastic slat for use in a decorative window blind having a plurality of slats supported in parallel relation and adapted to be rotated about their longitudinal axes, the method comprising the steps of:
   (a) preparing a strip of flexible and resilient planar thermoplastic material of not more than about 1/16 inch thickness having selected light-transmitting qualities;
   (b) deforming the planar strip into a permanent V-shaped transverse cross-sectional configurations which is stiff and will not sag when supported by spaced blind slat supporting means, by directing the strip without the application of heat lengthwise between rotatable male and female forming rolls, the male forming roll having an annular male forming member that terminates in a V-shaped forming surface having an apex with a radius of curvature of not more than about ¼ inch, the female forming rolls having two annular female forming members spaced on either side of the male forming roll, the male forming roll engaging one side of the strip and the female forming rolls engaging the other side of the strip, and the male forming roll further extending between the female forming rolls a desired distance to cause the female forming rolls to bend the strip over the apex of the V-shaped forming surface to exceed the elastic limit of the strip material over the apex so that first and second portions of the strip on either side of a bend will intersect at a permanent desired angle after the strip material has exhibited characteristic return toward its undeformed state due to memory.

9. The method of claim 8 wherein the strip is deformed to a transverse V-shaped cross-sectional configuration in which first and second portions of the strip intersect at an angle which dereases as the male forming member is inserted further between the female forming members.

10. The method of claim 8 wherein the thermoplastic material has a thickness of from 0.015 to 0.030 inches and wherein the forming surface has a radius of not more than ⅛ inch.

11. The method of claim 8 wherein the thermoplastic material is selected from the group consisting of polycarbonate, alloys of polycarbonate, and material exhibiting deforming characteristics substantially similar to polycarbonate.

12. The method of claim 8 wherein at least one of the first and second portions of the strip is transparent and transmits light with a minimum of distortion.

13. The method of claim 8 wherein the strip is permanently deformed to a transverse V-shaped cross-sectional configuration in which first and second portions of the strip correspond to two sides of a V intersecting at an angle of 90° to 160°.

* * * * *